US011440517B2

(12) United States Patent
Tsuda (10) Patent No.: US 11,440,517 B2
(45) Date of Patent: Sep. 13, 2022

(54) VEHICLE BRAKE CONTROL DEVICE

(71) Applicant: NISSIN KOGYO CO., LTD., Tomi (JP)

(72) Inventor: Fumiya Tsuda, Tomi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 193 days.

(21) Appl. No.: 16/828,398

(22) Filed: Mar. 24, 2020

(65) Prior Publication Data
US 2020/0307532 A1   Oct. 1, 2020

(30) Foreign Application Priority Data

Mar. 25, 2019   (JP) ............................. JP2019-056391

(51) Int. Cl.
*B60T 8/1761* (2006.01)
*B60T 8/171* (2006.01)
*B60T 8/172* (2006.01)

(52) U.S. Cl.
CPC ............ *B60T 8/1761* (2013.01); *B60T 8/171* (2013.01); *B60T 8/172* (2013.01); *B60T 2210/14* (2013.01)

(58) Field of Classification Search
CPC ........ B60T 8/1761; B60T 8/171; B60T 8/172; B60T 2210/14
See application file for complete search history.

(56) References Cited

U.S. PATENT DOCUMENTS

| | | | | |
|---|---|---|---|---|
| 5,498,072 A | * | 3/1996 | Shimizu .................. | B60T 8/175 303/191 |
| 6,089,682 A | | 7/2000 | Ishikawa et al. | |
| 6,266,602 B1 | * | 7/2001 | Yamaura ................. | B60T 8/172 303/112 |

FOREIGN PATENT DOCUMENTS

| | | | | |
|---|---|---|---|---|
| EP | 2944526 A1 | * | 11/2015 | ............ B60T 8/1706 |
| JP | 11078840 | | 3/1999 | |
| JP | 2017154531 A | * | 9/2017 | |

OTHER PUBLICATIONS

The extended European Search Report issued in EP application No. 20165181.7 dated May 29, 2020, 8 pages.

* cited by examiner

*Primary Examiner* — Frederick M Brushaber
*Assistant Examiner* — Elizabeth Yang
(74) *Attorney, Agent, or Firm* — Andrew M. Calderon; Roberts Calderon Safran & Cole, P.C.

(57) ABSTRACT

A vehicle brake control device including a wheel speed acquisition section, a wheel acceleration calculation section, an anti-lock brake control section, a bad road determination section, and a bad road amount setting section. The wheel acceleration calculation section calculates a first wheel acceleration and a second wheel acceleration. The bad road determination section determines that a running road surface is a bad road when the calculated first wheel acceleration is larger than a first boundary line where the first wheel acceleration increases as the second wheel acceleration is larger in an area where the first wheel acceleration is larger than the second wheel acceleration. The bad road amount setting section increases a bad road amount as the calculated first wheel acceleration is larger when it is determined that a running road surface is a bad road.

19 Claims, 6 Drawing Sheets

FIG.4A
GOOD ROAD

FIG.4B
BAD ROAD

VEHICLE BRAKE CONTROL DEVICE

CROSS-REFERENCE TO RELATED APPLICATIONS

This application is based upon and claims the benefit of priority from prior Japanese patent application No. 2019-056391, filed on Mar. 25, 2019, the entire contents of which is incorporated herein by reference.

TECHNICAL FIELD

The present disclosure relates to a vehicle brake control device.

BACKGROUND ART

Conventionally, there is known a vehicle brake control device having a configuration in which a brake pressure of a wheel brake is reduced when a slip ratio calculated based on a wheel speed and a vehicle speed exceeds a target slip ratio (see JPH11-078840). In this technique, whether or not a running road surface is a bad road is determined based on a wheel speed and a wheel acceleration of a front wheel or a rear wheel, and a wheel speed used for calculating a slip ratio when a vehicle runs on a bad road is corrected to an increasing side.

SUMMARY

By the way, in a vehicle brake control device in which a slip ratio and a slip amount are corrected by executing a bad road determination, there is a need to improve the accuracy of the anti-lock brake control by improving the accuracy of the bad road determination and the accuracy of the correction.

Therefore, the present disclosure aims to provide a vehicle brake control device capable of improving the accuracy of the anti-lock brake control.

A vehicle brake control device including:
a wheel speed acquisition section configured to acquire a wheel speed of one of a front wheel and a rear wheel;
a wheel acceleration calculation section configured to calculate a wheel acceleration of the one wheel based on the wheel speed;
an anti-lock brake control section configured to execute an anti-lock brake control for the one wheel based on a slip amount based on the wheel speed and a vehicle speed;
a bad road determination section configured to determine whether or not a running road surface is a bad road based on the wheel acceleration; and
a bad road amount setting section configured to set a bad road amount for correcting the slip amount based on the determination result of the bad road determination section.

The wheel acceleration calculation section calculates, as the wheel acceleration, a first wheel acceleration and a second wheel acceleration in which a high-frequency component is attenuated more than the first wheel acceleration.

The bad road determination section determines that a running road surface is a bad road when the calculated first wheel acceleration is larger than a first boundary line where the first wheel acceleration increases as the second wheel acceleration is larger in an area where the first wheel acceleration is larger than the second wheel acceleration.

The bad road amount setting section increases the bad road amount as the calculated first wheel acceleration is larger when it is determined that a running road surface is a bad road.

According to this configuration, since the bad road determination is executed based on the first boundary line based on two types of wheel accelerations with different responsiveness, the accuracy of the bad road determination can be improved. Further, since the bad road amount is changed according to the first wheel acceleration, the accuracy of the correction associated with the bad road determination can be improved. In this way, the accuracy of the anti-lock brake control can be improved.

The vehicle brake control device according to the above, the first boundary line may have a step-like portion formed by:
a first line segment in which the first wheel acceleration is a constant first value;
a second line segment in which the first wheel acceleration is a constant second value larger than the first value;
a third line segment in which the second wheel acceleration is a constant third value and which connects the first line segment and the second line segment; and
a fourth line segment in which the second wheel acceleration is a constant fourth value larger than the third value and which extends from the second line segment.

The vehicle brake control device according to the above, the bad road determination section may determine that a running road surface is a bad road when the calculated first wheel acceleration is larger than the first value and equal to or less than the second value, and the calculated second wheel acceleration is smaller than the third value, and the bad road amount setting section sets the bad road amount to a first bad road amount.

The bad road determination section may determine that a running road surface is a bad road when the calculated first wheel acceleration is larger than the second value and the calculated second wheel acceleration is smaller than the fourth value, and the bad road amount setting section sets the bad road amount to a second bad road amount larger than the first bad road amount.

According to this configuration, since the bad road determination is executed based on a plurality of values based on two types of wheel accelerations with different responsiveness, the accuracy of the bad road determination can be improved. Further, the bad road amount is set to the large second bad road amount when the first wheel acceleration is larger than the second value that is larger than the first value. In this way, the bad road amount can be set according to the degree of the bad road, and the accuracy of the correction by the bad road amount can be improved. As a result, the accuracy of the anti-lock brake control can be improved.

A vehicle brake control device including:
a wheel speed acquisition section configured to acquire a wheel speed of one of a front wheel and a rear wheel;
a wheel acceleration calculation section configured to calculate a wheel acceleration of the one wheel based on the wheel speed;
an anti-lock brake control section configured to execute an anti-lock brake control for the one wheel based on a slip amount based on the wheel speed and a vehicle speed;
a bad road determination section configured to determine whether or not a running road surface is a bad road based on the wheel acceleration; and
a bad road amount setting section configured to set a bad road amount for correcting the slip amount based on the determination result of the bad road determination section.

The wheel acceleration calculation section calculates, as the wheel acceleration, a first wheel acceleration and a second wheel acceleration in which a high-frequency component is attenuated more than the first wheel acceleration.

The bad road determination section determines that a running road surface is a bad road when the calculated first wheel acceleration is smaller than a second boundary line where the first wheel acceleration increases as the second wheel acceleration is larger in an area where the first wheel acceleration is smaller than the second wheel acceleration.

The bad road amount setting section increases the bad road amount as the calculated first wheel acceleration is smaller when it is determined that a running road surface is a bad road.

According to this configuration, since the bad road determination is executed based on the second boundary line based on two types of wheel accelerations with different responsiveness, the accuracy of the bad road determination can be improved. Further, since the bad road amount is changed according to the first wheel acceleration, the accuracy of the correction associated with the bad road determination can be improved. In this way, the accuracy of the anti-lock brake control can be improved.

The vehicle brake control device according to the above, the second boundary line may have a step-like portion formed by:

a fifth line segment in which the first wheel acceleration is a constant fifth value;

a sixth line segment in which the first wheel acceleration is a constant sixth value smaller than the fifth value;

a seventh line segment in which the second wheel acceleration is a constant seventh value and which connects the fifth line segment and the sixth line segment; and an eighth line segment in which the second wheel acceleration is a constant eighth value smaller than the seventh value and which extends from the sixth line segment.

The vehicle brake control device according to the above, the bad road determination section may determine that a running road surface is a bad road when the calculated first wheel acceleration is smaller than the fifth value and equal to or larger than the sixth value, and the calculated second wheel acceleration is larger than the seventh value, and the bad road amount setting section sets the bad road amount to a third bad road amount.

The bad road determination section may determine that a running road surface is a bad road when the calculated first wheel acceleration is smaller than the sixth value and the calculated second wheel acceleration is larger than the eighth value, and the bad road amount setting section sets the bad road amount to a fourth bad road amount larger than the third bad road amount.

According to this configuration, since the bad road determination is executed based on a plurality of values based on two types of wheel accelerations with different responsiveness, the accuracy of the bad road determination can be improved. Further, the bad road amount is set to the large fourth bad road amount when the first wheel acceleration is smaller than the sixth value that is smaller than the fifth value. In this way, the bad road amount can be set according to the degree of the bad road, and the accuracy of the correction by the bad road amount can be improved. As a result, the accuracy of the anti-lock brake control can be improved.

According to the present disclosure, it is possible to improve the accuracy of the anti-lock brake control.

BRIEF DESCRIPTION OF DRAWINGS

FIGS. 3A and 3B are diagrams plotting a first wheel acceleration and a second wheel acceleration of a front wheel.

FIGS. 4A and 4B are diagrams plotting a first wheel acceleration and a second wheel acceleration of a rear wheel.

DETAILED DESCRIPTION

Hereinafter, an embodiment will be described in detail with reference to the drawings as appropriate.

Figure 1:
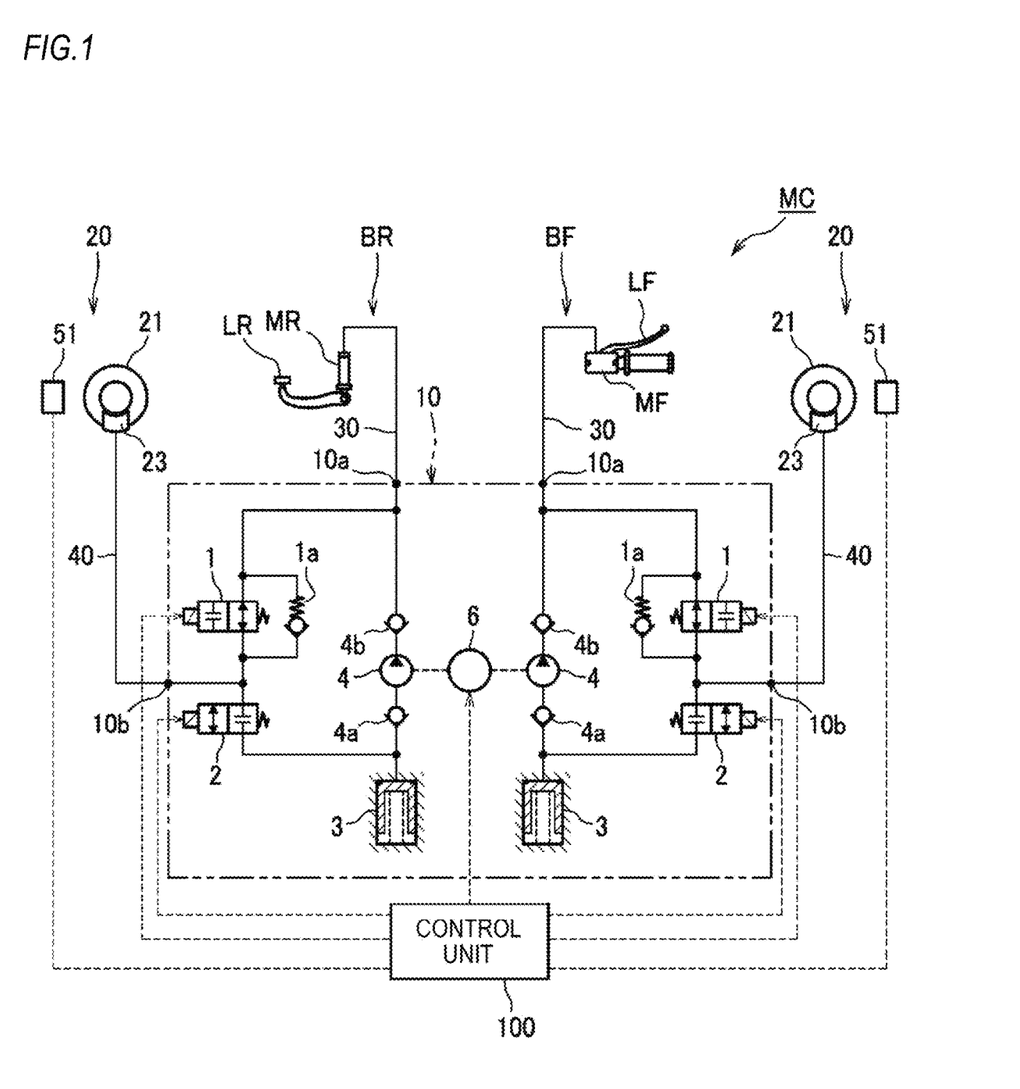
FIG. 1 is a view showing a configuration of a motorcycle including a vehicle brake control device according to an embodiment.

As shown in FIG. 1, a motorcycle MC as an example of a vehicle includes a brake system BF of a front wheel as a driven wheel, a brake system BR of a rear wheel as a drive wheel, wheel speed sensors 51, and a control unit 100 as an example of a vehicle brake control device.

Each wheel speed sensor 51 is a sensor that generates a pulse wave with the rotation of a wheel. The wheel speed sensors 51 are provided on both the front wheel and the rear wheel, and detect the wheel speed of each wheel.

The brake system BF mainly includes a master cylinder MF, a hydraulic unit 10, a front wheel brake 20, a piping 30 connecting the master cylinder MF and an inlet port 10*a* of the hydraulic unit 10, and a piping 40 connecting an outlet port 10*b* of the hydraulic unit 10 and the front wheel brake 20. Further, the brake system BR mainly includes a master cylinder MR, the hydraulic unit 10, a rear wheel brake 20, the piping 30 connecting the master cylinder MR and the inlet port 10*a* of the hydraulic unit 10, and the piping 40 connecting the outlet port 10*b* of the hydraulic unit 10 and the rear wheel brake 20. Meanwhile, the brake system BR on the rear wheel side has the same configuration as the brake system BF on the front wheel side. In the following description, the brake system BF on the front wheel side will be mainly described, and the description of the brake system on the rear wheel side will be omitted as appropriate.

The master cylinder MF is a device that outputs a hydraulic pressure according to the operation amount of a brake lever LF operated by a driver with a right hand, and the master cylinder MR is a device that outputs a hydraulic pressure according to the operation amount of a brake pedal LR operated by a driver with a right foot.

Each of the wheel brakes 20 mainly includes a brake rotor 21, a brake pad (not shown), and a wheel cylinder 23 that generates a braking force by pressing the brake pad against the brake rotor 21 by the hydraulic pressure output from the master cylinders MF, MR.

The hydraulic unit 10 mainly includes inlet valves 1, check valves 1*a*, outlet valves 2, reservoirs 3, pumps 4, suction valves 4*a*, discharge valves 4*b*, and a motor 6. Normally, a fluid passage communicates from the inlet port 10*a* to the outlet port 10*b*, and the hydraulic pressure output from the master cylinder MF is transmitted to the front wheel brake 20.

The inlet valve 1 is a normally-open electromagnetic valve provided between the master cylinder MF and the front wheel brake 20. The inlet valve 1 is normally opened, so that the hydraulic pressure is allowed to be transmitted from the master cylinder MF to the front wheel brake 20. Further, the inlet valve 1 is closed by the control unit 100 when the front wheel is about to be locked, so that the transmission of the hydraulic pressure from the master cylinder MF to the front wheel brake 20 is blocked.

The outlet valve 2 is a normally-closed electromagnetic valve provided between the front wheel brake 20 and the reservoir 3. The outlet valve 2 is normally closed, but is opened by the control unit 100 when the front wheel is about to be locked. In this way, the hydraulic pressure applied to the front wheel brake 20 is released to the reservoir 3.

The check valve 1a is a valve that allows only the flow of the brake fluid from the side of the front wheel brake 20 into the side of the master cylinder MF. The check valve 1a is connected to the inlet valve 1 in parallel. When the input of the hydraulic pressure from the master cylinder MF is released, the check valve 1a allows the flow of the brake fluid from the side of the front wheel brake 20 to the side of the master cylinder MF even when the inlet valve 1 is closed.

The reservoir 3 temporarily stores the brake fluid that is released when the outlet valve 2 is opened. The pump 4 is provided between the reservoir 3 and the master cylinder MF. The pump 4 is driven by the rotation of the motor 6 to suck the brake fluid stored in the reservoir 3 and return it to the master cylinder MF.

The hydraulic unit 10 adjusts a braking force, specifically, a hydraulic pressure of the wheel cylinder 23 (hereinafter, also referred to as a "wheel cylinder pressure") by controlling the opening and closing state of the inlet valve 1 and the outlet valve 2 by the control unit 100. For example, when the brake lever LF is operated in the normal state where the inlet valve 1 is opened and the outlet valve 2 is closed, the hydraulic pressure of the master cylinder MF is transmitted to the wheel cylinder 23 as it is, which leads to a pressure increase state in which the braking force increases. Further, in the state where the inlet valve 1 is closed and the outlet valve 2 is opened, the brake fluid is discharged from the wheel cylinder 23 toward the reservoir 3, which leads to a pressure reduction state where the braking force decreases. Furthermore, in a state where both the inlet valve 1 and the outlet valve 2 are closed, the hydraulic pressure of the wheel cylinder 23 is maintained, which leads to a maintenance state where the braking force is maintained.

The control unit 100 is a device that mainly executes a wheel lock suppression control for suppressing the lock of the front wheel or the rear wheel by controlling the hydraulic unit 10. The control unit 100 includes, for example, a Central Processing Unit (CPU), a Random Access Memory (RAM), a Read Only Memory (ROM), and an input/output circuit, and the like. The control unit 100 executes a control by performing various arithmetic processing based on an input from the wheel speed sensor 51, a program and data stored in the ROM, and the like.

Figure 2:
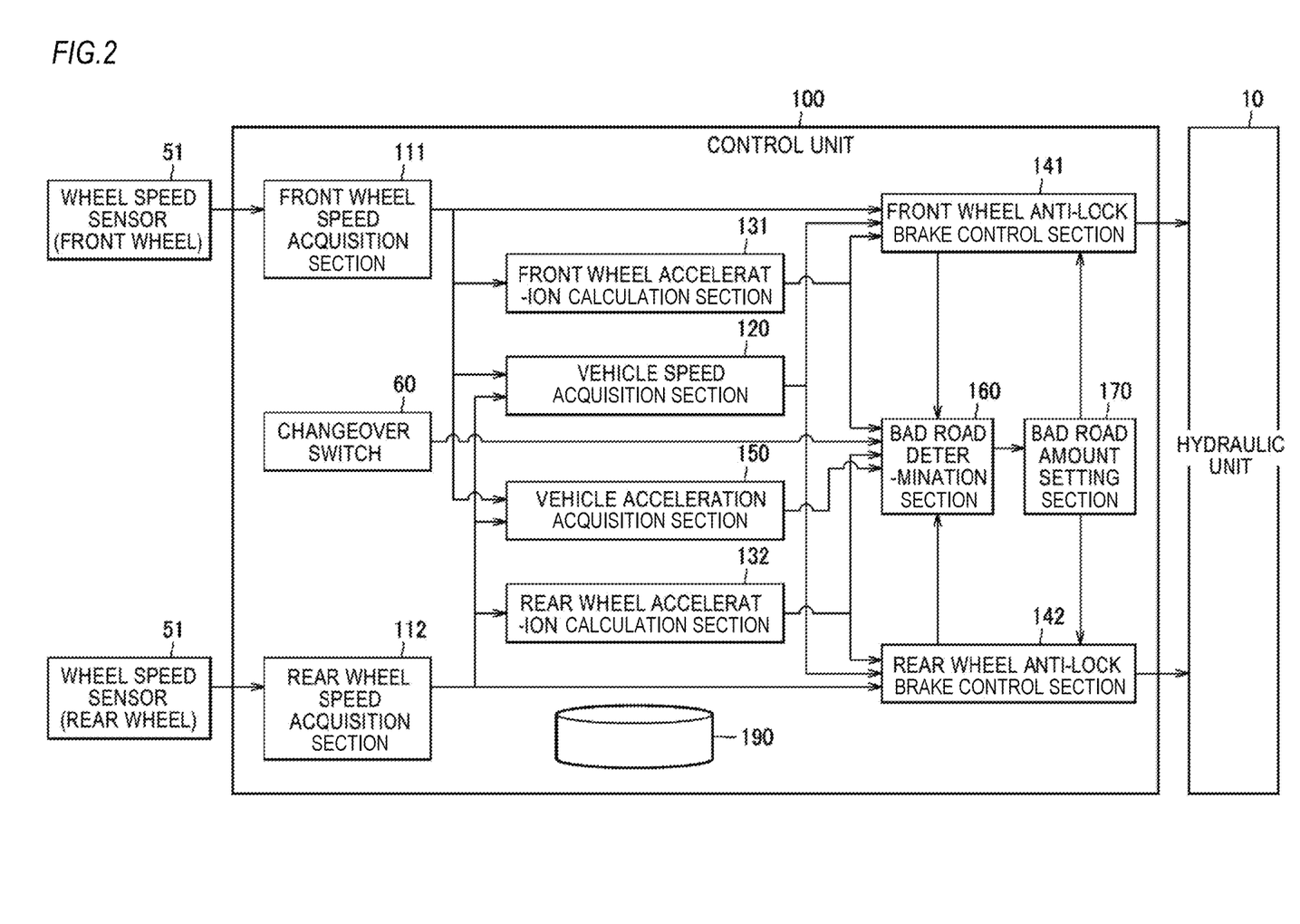
FIG. 2 is a block diagram showing a configuration of a control unit.

As shown in FIG. 2, the control unit 100 includes a changeover switch 60, a front wheel speed acquisition section 111 and a rear wheel speed acquisition section 112 as a wheel speed acquisition section, a vehicle speed acquisition section 120, a front wheel acceleration calculation section 131 and a rear wheel acceleration calculation section 132 as a wheel acceleration calculation section, a front wheel anti-lock brake control section 141 and a rear wheel anti-lock brake control section 142 as an anti-lock brake control section, a vehicle acceleration acquisition section 150, a bad road determination section 160, a bad road amount setting section 170, and a storage section 190.

The front wheel speed acquisition section 111 has a function of acquiring a wheel speed of one of the front wheel and the rear wheel, specifically, a front wheel speed Vwf via the wheel speed sensor 51. The front wheel speed acquisition section 111 outputs the front wheel speed Vwf to the vehicle speed acquisition section 120, the front wheel acceleration calculation section 131, the front wheel anti-lock brake control section 141 and the vehicle acceleration acquisition section 150.

The rear wheel speed acquisition section 112 has a function of acquiring a wheel speed of one of the front wheel and the rear wheel, specifically, a rear wheel speed Vwr via the wheel speed sensor 51. The rear wheel speed acquisition section 112 outputs the rear wheel speed Vwr to the vehicle speed acquisition section 120, the rear wheel acceleration calculation section 132, the rear wheel anti-lock brake control section 142 and the vehicle acceleration acquisition section 150.

The vehicle speed acquisition section 120 has a function of acquiring a vehicle speed Vc. Specifically, the vehicle speed acquisition section 120 calculates and acquires the vehicle speed Vc based on the front wheel speed Vwf and the rear wheel speed Vwr by a known method. The vehicle speed acquisition section 120 outputs the vehicle speed Vc to the front wheel anti-lock brake control section 141 and the rear wheel anti-lock brake control section 142.

The front wheel acceleration calculation section 131 has a function of calculating a front wheel acceleration Awf based on the front wheel speed Vwf. Specifically, the front wheel acceleration calculation section 131 calculates a first wheel acceleration Awf1 and a second wheel acceleration Awf2 as the front wheel acceleration Awf.

As an example, the front wheel acceleration calculation section 131 calculates the first wheel acceleration Awf1 by differentiating the front wheel speed Vwf and calculates the second wheel acceleration Awf2 by differentiating a value obtained by filtering the front wheel speed Vwf by a low-pass filter. Therefore, the second wheel acceleration Awf2 has a value in which a high-frequency component is attenuated more than the first wheel acceleration Awf1.

The front wheel acceleration calculation section 131 outputs the front wheel acceleration Awf to the front wheel anti-lock brake control section 141 and the bad road determination section 160.

The rear wheel acceleration calculation section 132 has a function of calculating a rear wheel acceleration Awr based on the rear wheel speed Vwr. Specifically, the rear wheel acceleration calculation section 132 calculates a first wheel acceleration Awr1 and a second wheel acceleration Awr2 as the rear wheel acceleration Awr.

As an example, the rear wheel acceleration calculation section 132 calculates the first wheel acceleration Awr1 by differentiating the rear wheel speed Vwr and calculates the second wheel acceleration Awr2 by differentiating a value obtained by filtering the rear wheel speed Vwr by a low-pass filter. Therefore, the second wheel acceleration Awr2 has a value in which a high-frequency component is attenuated more than the first wheel acceleration Awr1.

The rear wheel acceleration calculation section 132 outputs the rear wheel acceleration Awr to the rear wheel anti-lock brake control section 142 and the bad road determination section 160.

The front wheel anti-lock brake control section 141 has a function capable of executing an anti-lock brake control for the front wheel.

The rear wheel anti-lock brake control section 142 has a function capable of executing an anti-lock brake control for the rear wheel.

Specifically, the anti-lock brake control section 141, 142 execute an anti-lock brake control for the front wheel or the rear wheel based on slip amounts SAf, SAr based on the wheel speeds Vwf, Vwr and the vehicle speed Vc.

Specifically, when the wheel accelerations Awf, Awr (Awf1, Awr1) become 0 or less and the slip amounts SAf, SAr become larger than a control intervention threshold, the anti-lock brake control section 141, 142 output an instruction for reducing the braking force (for reducing pressure) to the hydraulic unit 10 to close the inlet valve 1 and open the outlet valve 2.

Further, when the wheel accelerations Awf, Awr (Awf1, Awr1) become larger than 0 after the pressure is reduced, the anti-lock brake control section 141, 142 output an instruction for maintaining the braking force to the hydraulic unit 10 to close both the inlet valve 1 and the outlet valve 2. Furthermore, when the wheel accelerations Awf, Awr (Awf1, Awr1) become 0 or less and the slip amounts SAf, SAr become a control intervention threshold or less after the braking force is maintained, the anti-lock brake control section 141, 142 output an instruction for increasing the braking force (for increasing pressure) to the hydraulic unit 10 to open the inlet valve 1 and close the outlet valve 2.

In the present embodiment, the front wheel anti-lock brake control section 141 calculates the front wheel slip amount SAf by the following equation.

$$SAf = Vc - Vwf - BAf \qquad \text{Equation (1)}$$

BAf is a front wheel bad road amount set by the bad road amount setting section 170.

Further, the rear wheel anti-lock brake control section 142 calculates the rear wheel slip amount SAr by the following equation.

$$SAr = Vc - Vwr - BAr \qquad \text{Equation (2)}$$

BAr is a rear wheel bad road amount set by the bad road amount setting section 170.

Meanwhile, in the present disclosure, the "slip amount" may be a value (slip ratio) obtained by dividing the above calculated value by the vehicle speed Vc.

The anti-lock brake control section 141, 142 change ABS execution flags Ff, Fr from 0 (non-execution) to 1 (execution) when the anti-lock brake control is started, and reset the ABS execution flags Ff, Fr from 1 to 0 when the anti-lock brake control is ended. The anti-lock brake control section 141, 142 outputs information on the ABS execution flags Ff, Fr to the bad road determination section 160.

The vehicle acceleration acquisition section 150 has a function of acquiring a vehicle acceleration Ac. Specifically, the vehicle acceleration acquisition section 150 calculates and acquires the vehicle acceleration Ac based on the front wheel speed Vwf and the rear wheel speed Vwr by a known method. Acceleration such as the vehicle acceleration Ac and the wheel accelerations Awf, Awr has a positive value during acceleration and has a negative value during deceleration. The vehicle acceleration acquisition section 150 outputs the vehicle acceleration Ac to the bad road determination section 160.

The bad road determination section 160 has a function of determining whether or not a road surface on which the motorcycle MC runs is a bad road based on the front wheel acceleration Awf or the rear wheel acceleration Awr. The bad road determination section 160 can change the conditions for the bad road determination by the changeover switch 60 according to the accuracy required for the bad road determination. Details will be described later.

The bad road determination section 160 executes a bad road determination by selectively using one of the front wheel acceleration Awf and the rear wheel acceleration Awr at least based on information on whether or not the anti-lock brake control for the front wheel is executed and the vehicle acceleration Ac. Specifically, the bad road determination section 160 executes the bad road determination by using the front wheel acceleration Awf when the anti-lock brake control for the front wheel is not executed (when the front wheel ABS execution flag Ff is 0) and the vehicle acceleration Ac is larger than a predetermined value Acth.

When executing the bad road determination by using the front wheel acceleration Awf, the bad road determination section 160 executes the bad road determination based on a first boundary line Lfth1 where the first wheel acceleration Awf1 increases as the second wheel acceleration Awf2 increases when the anti-lock brake control for the rear wheel is executed (when the rear wheel ABS execution flag Fr is 1).

Figure 3A:
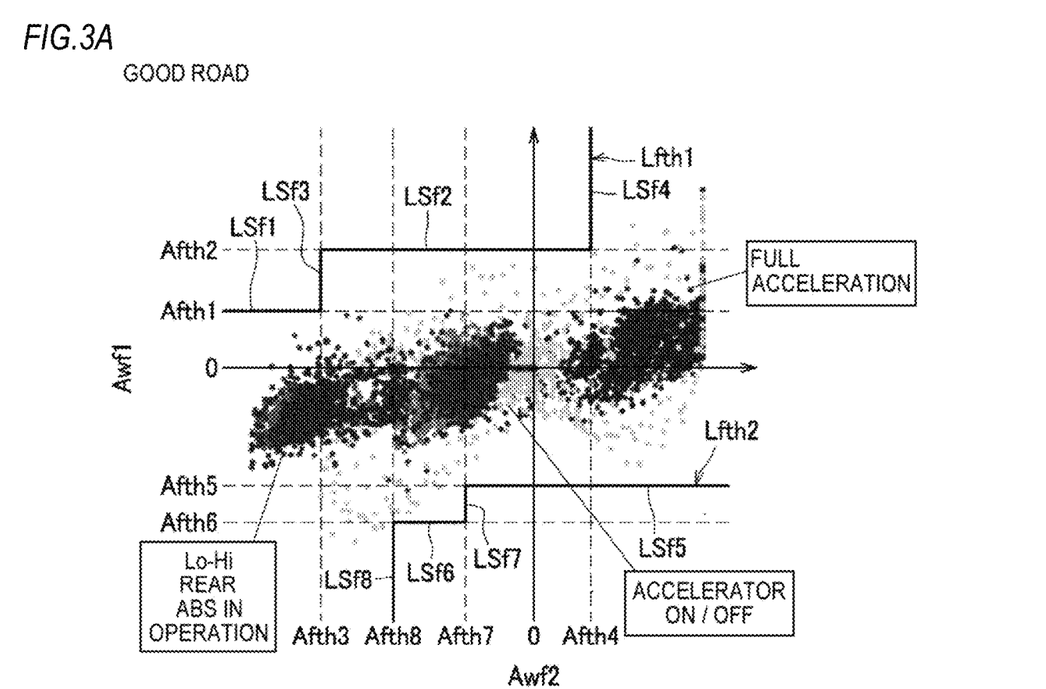
FIG. 3A is a diagram when the motorcycle runs on a good road.

Specifically, as shown in FIG. 3A, the bad road determination section 160 determines that the running road surface is a bad road when the first wheel acceleration Awf1 calculated by the front wheel acceleration calculation section 131 is larger than the first boundary line Lfth1 in an area where the first wheel acceleration Awf1 is larger than the second wheel acceleration Awf2. Meanwhile, in FIGS. 3A and 3B, the scale of the second wheel acceleration Awf2 (horizontal axis) is larger than the scale of the first wheel acceleration Awf1 (vertical axis). On an ideal good road, the first wheel acceleration Awf1 is equal to the second wheel acceleration Awf2.

The first boundary line Lfth1 is a step-like line formed by a first line segment LSf1, a second line segment LSf2, a third line segment LSf3, and a fourth line segment LSf4. The first line segment LSf1 is a line segment in which the first wheel acceleration Awf1 is a constant first value Afth1, and the second line segment LSf2 is a line segment in which the first wheel acceleration Awf1 is a constant second value Afth2. The second value Afth2 is a value larger than the first value Afth1.

Further, the third line segment LSf3 is a line segment in which the second wheel acceleration Awf2 is a constant third value Afth3, and connects the first line segment LSf1 and the second line segment LSf2. Further, the fourth line segment LSf4 is a line segment in which the second wheel acceleration Awf2 is a constant fourth value Afth4, and extends from the second line segment LSf2. The fourth value Afth4 is a value larger than the third value Afth3.

The bad road determination section 160 determines that the running road is a bad road when the calculated first wheel acceleration Awf1 is larger than the first value Afth1 and equal to or less than the second value Afth2, and the calculated second wheel acceleration Awf2 is smaller than the third value Afth3. Further, the bad road determination section 160 determines that the running road is a bad road when the calculated first wheel acceleration Awf1 is larger than the second value Afth2 and the calculated second wheel acceleration Awf2 is smaller than the fourth value Afth4.

Further, when executing the bad road determination by using the front wheel acceleration Awf, the bad road determination section 160 executes the bad road determination based on a second boundary line Lfth2 where the first wheel acceleration Awf1 increases as the second wheel acceleration Awf2 increases when the anti-lock brake control for the rear wheel is not executed (when the rear wheel ABS execution flag Fr is 0).

Specifically, the bad road determination section 160 determines that the running road is a bad road when the calculated first wheel acceleration Awf1 is smaller than the second boundary line Lfth2 in an area where the first wheel acceleration Awf1 is smaller than the second wheel acceleration Awf2.

The second boundary line Lfth2 is a step-like line formed by a fifth line segment LSf5, a sixth line segment LSf6, a seventh line segment LSf7, and an eighth line segment LSf8. The fifth line segment LSf5 is a line segment in which the first wheel acceleration Awf1 is a constant fifth value Afth5, and the sixth line segment LSf6 is a line segment in which the first wheel acceleration Awf1 is a constant sixth value Afth6. The sixth value Afth6 is a value smaller than the fifth value Afth5.

Further, the seventh line segment LSf7 is a line segment in which the second wheel acceleration Awf2 is a constant seventh value Afth7, and connects the fifth line segment LSf5 and the sixth line segment LSf6. Further, the eighth line segment LSf8 is a line segment in which the second wheel acceleration Awf2 is a constant eighth value Afth8, and extends from the sixth line segment LSf6. The eighth value Afth8 is a value smaller than the seventh value Afth7.

The bad road determination section 160 determines that the running road is a bad road when the calculated first wheel acceleration Awf1 is smaller than the fifth value Afth5 and equal to or larger than the sixth value Afth6, and the calculated second wheel acceleration Awf2 is larger than the seventh value Afth7. Further, the bad road determination section 160 determines that the running road is a bad road when the calculated first wheel acceleration Awf1 is smaller than the sixth value Afth6 and the calculated second wheel acceleration Awf2 is larger than the eighth value Afth8.

The values Afth1 to Afth8 are set in advance based on experiments, simulations, and the like.

Figure 3B:
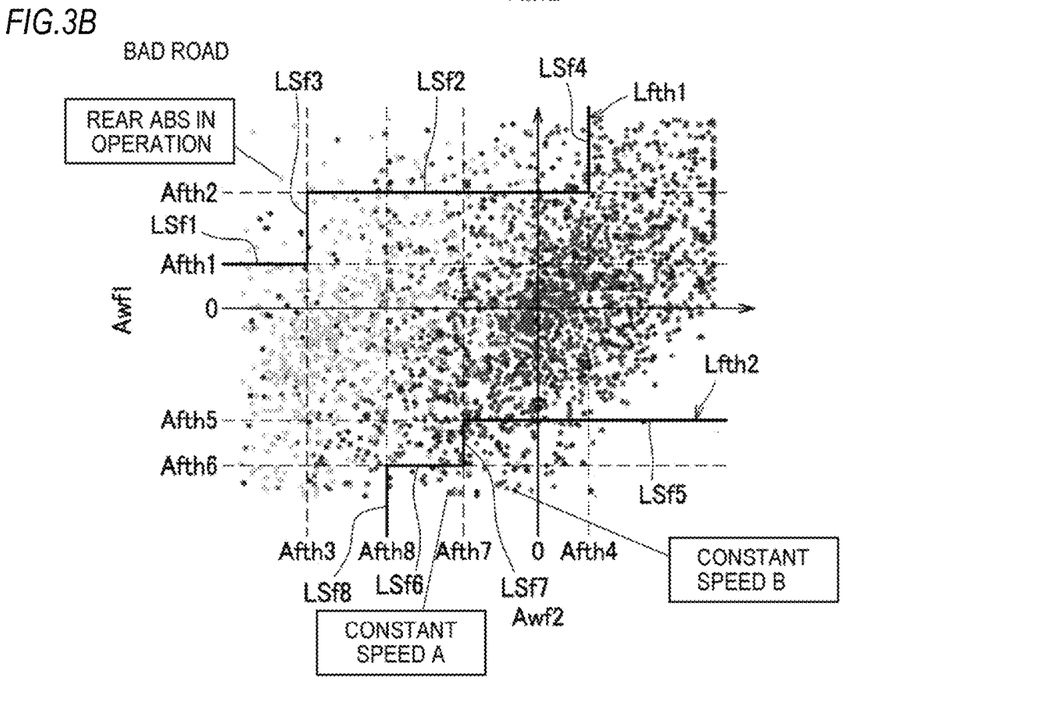
FIG. 3B is a diagram when the motorcycle runs on a bad road.

For example, the values Afth1 to Afth8 can be set based on FIG. 3A in which the motorcycle MC is run on a good road (a road surface that is not a bad road) under different running conditions, and the first wheel acceleration Awf1 and the second wheel acceleration Awf2 are calculated and plotted for each running condition, and FIG. 3B in which the motorcycle MC is run on a bad road such as a cobblestone road, and the first wheel acceleration Awf1 and the second wheel acceleration Awf2 are calculated and plotted.

As shown in FIG. 3B, when the running road surface is a bad road, the plotted points are distributed over substantially the entire area. In particular, the plotted points are plotted up to an area larger than the first boundary line Lfth1 when the anti-lock brake control for the rear wheel is executed ("REAR ABS IN OPERATION"). Further, the plotted points are plotted up to an area smaller than the second boundary line Lfth2 when the motorcycle MC is run on a bad road at constant speeds A, B ("CONSTANT SPEED A" and "CONSTANT SPEED B").

On the other hand, as shown in FIG. 3A, when the running road surface is a good road, there is a low probability that the plotted points are located in an area where the first wheel acceleration Awf1 is larger than the second value Afth2 and the second wheel acceleration Awf2 is smaller than the fourth value Afth4, even in any case of when full acceleration is performed ("FULL ACCELERATION"), when ON/Off of an accelerator is repeated ("ACCELERATOR ON/OFF"), and when the road surface is switched from a low friction coefficient road surface to a high friction coefficient road surface and the anti-lock brake control for the rear wheel is executed ("Lo-Hi REAR ABS IN OPERATION"). Further, when the running road surface is a good road, there is a low probability that the plotted points are located in an area where the first wheel acceleration Awf1 is larger than the first value Afth1 and the second wheel acceleration Awf2 is smaller than the third value Afth3.

Further, when the running road surface is a good road, there is a low probability that the plotted points are located in an area where the first wheel acceleration Awf1 is smaller than the sixth value Afth6 and the second wheel acceleration Awf2 is larger than the eighth value Afth8. Furthermore, when the running road surface is a good road, there is a low probability that the plotted points are located in an area where the first wheel acceleration Awf1 is smaller than the fifth value Afth5 and the second wheel acceleration Awf2 is larger than the seventh value Afth7.

In this way, the bad road determination section 160 determines that the running road surface is a bad road when the first wheel acceleration Awf1 is larger than the first value Afth1 and equal to or less than the second value Afth2, and the second wheel acceleration Awf2 is smaller than the third value Afth3, or when the first wheel acceleration Awf1 is larger than the second value Afth2 and the second wheel acceleration Awf2 is smaller than the fourth value Afth4.

Further, the bad road determination section 160 determines that the running road surface is a bad road when the first wheel acceleration Awf1 is smaller than the fifth value Afth5 and equal to or larger than the sixth value Afth6, and the second wheel acceleration Awf2 is larger than the seventh value Afth7, or when the first wheel acceleration Awf1 is smaller than the sixth value Afth6 and the calculated second wheel acceleration Awf2 is larger than the eighth value Afth8.

Further, the bad road determination section 160 executes the bad road determination by using the rear wheel acceleration Awr when the front wheel ABS execution flag Ff is 0 and the vehicle acceleration Ac is equal to or less than the predetermined value Acth, and the rear wheel ABS execution flag Fr is 0. Further, the bad road determination section 160 executes the bad road determination by using the rear wheel acceleration Awr also when the anti-lock brake control for the front wheel is executed (when the front wheel ABS execution flag Ff is 1), and the rear wheel ABS execution flag Fr is 0.

Figure 4A:
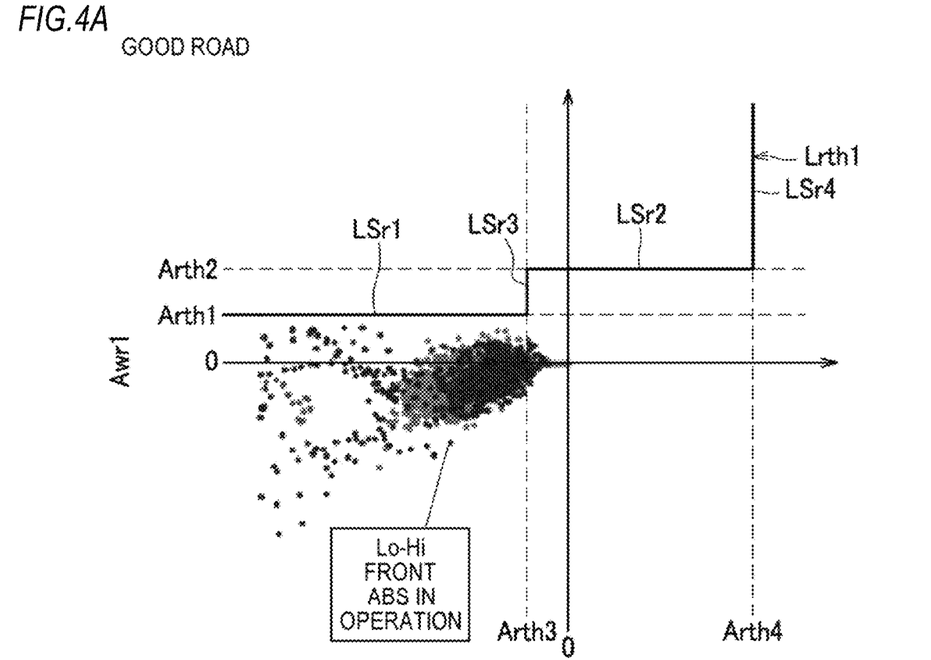
FIG. 4A is a diagram when the motorcycle runs on a good road.

When executing the bad road determination by using the rear wheel acceleration Awr, the bad road determination section 160 executes the bad road determination based on a first boundary line Lrth1 where the first wheel acceleration Awr1 increases as the second wheel acceleration Awr2 increases.

Specifically, as shown in FIG. 4A, the bad road determination section 160 determines that the running road surface is a bad road when the first wheel acceleration Awr1 calculated by the rear wheel acceleration calculation section 132 is larger than the first boundary line Lrth1 in an area where the first wheel acceleration Awr1 is larger than the second wheel acceleration Awr2. Meanwhile, in FIGS. 4A and 4B, the scale of the second wheel acceleration Awr2 (horizontal axis) is larger than the scale of the first wheel acceleration Awr1 (vertical axis). On an ideal good road, the first wheel acceleration Awr1 is equal to the second wheel acceleration Awr2.

The first boundary line Lrth1 is a step-like line formed by a first line segment LSr1, a second line segment LSr2, a third line segment LSr3, and a fourth line segment LSr4. The first line segment LSr1 is a line segment in which the first wheel acceleration Awr1 is a constant first value Arth1, and the second line segment LSr2 is a line segment in which the first wheel acceleration Awr1 is a constant second value Arth2. The second value Arth2 is a value larger than the first value Arth1.

Further, the third line segment LSr3 is a line segment in which the second wheel acceleration Awr2 is a constant third value Arth3, and connects the first line segment LSr1 and the second line segment LSr2. Further, the fourth line segment LSr4 is a line segment in which the second wheel acceleration Awr2 is a constant fourth value Arth4, and extends from the second line segment LSr2. The fourth value Arth4 is a value larger than the third value Arth3.

The bad road determination section 160 determines that the running road is a bad road when the calculated first wheel acceleration Awr1 is larger than the first value Arth1 and equal to or less than the second value Arth2, and the calculated second wheel acceleration Awr2 is smaller than the third value Arth3. Further, the bad road determination section 160 determines that the running road is a bad road when the calculated first wheel acceleration Awr1 is larger than the second value Arth2 and the calculated second wheel acceleration Awr2 is smaller than the fourth value Arth4.

The values Arth1 to Arth4 are set in advance based on experiments, simulations, and the like.

Figure 4B:
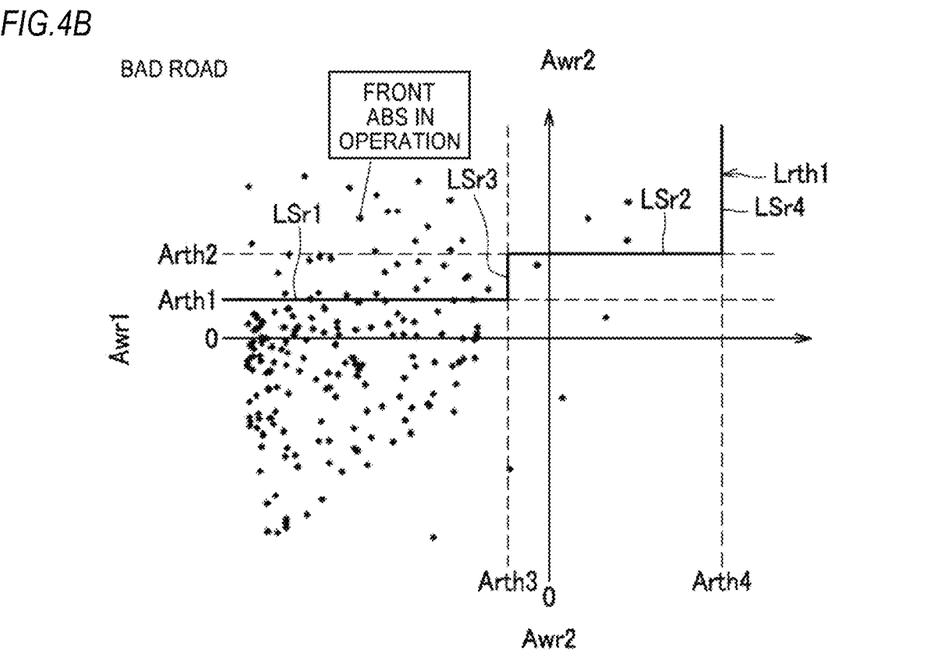
FIG. 4B is a diagram when the motorcycle runs on a bad road.

For example, the values Arth1 to Arth4 can be set based on FIG. 4A in which the motorcycle MC is run on a good road, and the first wheel acceleration Awr1 and the second wheel acceleration Awr2 are calculated and plotted, and FIG. 4B in which the motorcycle MC is run on a bad road, and the first wheel acceleration Awr1 and the second wheel acceleration Awr2 are calculated and plotted.

As shown in FIG. 4B, when the running road surface is a bad road, all the plotted points are distributed in an area where the second wheel acceleration Awr2 is smaller than the fourth value Arth4. Specifically, when the anti-lock brake control for the front wheel is executed ("FRONT ABS IN OPERATION"), the plotted points are plotted up to an area larger than the first boundary line Lrth1.

On the other hand, as shown in FIG. 4A, when the running road surface is a good road, all the plotted points are located in an area where the first wheel acceleration Awr1 is equal to or less than the second value Arth2 even when the road surface is switched from a low friction coefficient road surface to a high friction coefficient road surface and the anti-lock brake control for the front wheel is executed ("Lo-Hi FRONT ABS IN OPERATION"). Further, when the running road surface is a good road, the plotted points are not distributed in an area where the first wheel acceleration Awr1 is larger than the first value Arth1 and the second wheel acceleration Awr2 is smaller than the third value Arth3.

In this way, the bad road determination section 160 determines that the running road surface is a bad road when the first wheel acceleration Awr1 is larger than the first value Arth1 and equal to or less than the second value Arth2, and the second wheel acceleration Awr2 is smaller than the third value Arth3, or when the first wheel acceleration Awr1 is larger than the second value Arth2 and the second wheel acceleration Awr2 is smaller than the fourth value Arth4.

In the present embodiment, the bad road determination section 160 executes the bad road determination by selectively using one of the front wheel acceleration Awf and the rear wheel acceleration Awr when the changeover switch 60 provided in the control unit 100 is turned on. On the other hand, when the changeover switch 60 is turned off, the bad road determination section 160 does not execute the bad road determination using the front wheel acceleration Awf, but executes only the bad road determination using the rear wheel acceleration Awr. The bad road determination section 160 outputs the information on the determination result to the bad road amount setting section 170.

The bad road amount setting section 170 has a function of setting the bad road amounts BAf, BAr for correcting the slip amounts SAf, SAr based on the determination result of the bad road determination section 160.

Specifically, when the running road surface is a bad road, the bad road amount setting section 170 increases the front wheel bad road amount BAf by an additional amount OAf and increases the rear wheel bad road amount BAr by an additional amount OAr. Thereafter, the bad road amount setting section 170 reduces the front wheel bad road amount BAf by a subtraction amount RAf and reduces the rear wheel bad road amount BAr by a subtraction amount RAr.

When it is determined that the running road is a bad road based on the first boundary line Lfth1 and the first wheel acceleration Awf1 of the front wheel, the bad road amount setting section 170 increases the bad road amounts BAf, BAr as the calculated first wheel acceleration Awf1 is larger. The reason is that, as the first wheel acceleration Awf1 is different from the second wheel acceleration Awf2, the fluctuation of the first wheel acceleration Awf1 is larger and the degree of the bad road is larger.

Specifically, when the bad road determination section 160 determines that the running road is a bad road based on the information that the first wheel acceleration Awf1 is larger than the first value Afth1 and equal to or less than the second value Afth2, and the second wheel acceleration Awf2 is smaller than the third value Afth3, the bad road amount setting section 170 sets the bad road amounts BAf, BAr to first bad road amounts BAf1, BAr1.

The first bad road amount BAf1 of the front wheel is obtained by increasing the front wheel bad road amount BAf by an additional amount OAf1 and then reducing the same by the subtraction amount RAf. The first bad road amount BAr1 of the rear wheel is obtained by increasing the rear wheel bad road amount BAr by an additional amount OAr1 and then reducing the same by the subtraction amount RAr.

Further, when the bad road determination section 160 determines that the running road is a bad road based on the information that the first wheel acceleration Awf1 is larger than the second value Afth2 and the second wheel acceleration Awf2 is smaller than the fourth value Afth4, the bad road amount setting section 170 sets the bad road amounts BAf, BAr to second bad road amounts BAf2, BAr2.

The second bad road amount BAf2 of the front wheel is obtained by increasing the front wheel bad road amount BAf by an additional amount OAf2 and then reducing the same by the subtraction amount RAf. The second bad road amount BAr2 of the rear wheel is obtained by increasing the rear wheel bad road amount BAr by an additional amount OAr2 and then reducing the same by the subtraction amount RAr.

The additional amounts OAf1, OAr1, OAf2, OAr2 and the subtraction amounts RAf, RAr are positive values set in advance based on experiments, simulations, and the like. The additional amounts OAf1, OAf2 are values larger than the subtraction amount RAf, and the additional amounts OAr1, OAr2 are values larger than the subtraction amount RAr.

Further, the additional amount OAf2 is a value larger than the additional amount OAf1, and the additional amount OAr2 is a value larger than the additional amount OAr1. Therefore, the second bad road amount BAf2 has a value larger than the first bad road amount BAf1, and the second bad road amount BAr2 has a value larger than the first bad road amount BAr1.

Meanwhile, the additional amount OAf1 and the additional amount OAr1 may be the same value or different values. Similarly, the additional amount OAf2 and the additional amount OAr2 may be the same value or different values, and the subtraction amount RAf and the subtraction amount RAr may be the same value or different values. Predetermined upper and lower limits are set for the bad road amounts BAf, BAr. As an example, the lower limit of the bad road amounts BAf, BAr is 0.

Further, when it is determined that the running road is a bad road based on the second boundary line Lfth2 and the first wheel acceleration Awf1 of the front wheel, the bad road amount setting section 170 increases the bad road amounts BAf, BAr as the calculated first wheel acceleration Awf1 is smaller.

Specifically, when the bad road determination section 160 determines that the running road is a bad road based on the information that the first wheel acceleration Awf1 is smaller than the fifth value Afth5 and equal to or larger than the sixth value Afth6, and the second wheel acceleration Awf2 is larger than the seventh value Afth7, the bad road amount setting section 170 sets the bad road amounts BAf, BAr to the first bad road amounts BAf1, BAr1 as an example of a third bad road amount.

Further, when the bad road determination section 160 determines that the running road is a bad road based on the information that the first wheel acceleration Awf1 is smaller than the sixth value Afth6 and the second wheel acceleration Awf2 is larger than the eighth value Afth8, the bad road amount setting section 170 sets the bad road amounts BAf, BAr to the second bad road amounts BAf2, BAr2 as an example of a fourth bad road amount. As described above, the second bad road amount BAf2 is a value larger than the first bad road amount BAf1, and the second bad road amount BAr2 is a value larger than the first bad road amount BAr1.

Further, when it is determined that the running road is a bad road based on the first boundary line Lrth1 and the first wheel acceleration Awr1 of the rear wheel, the bad road amount setting section 170 increases the bad road amounts BAf, BAr as the calculated first wheel acceleration Awr1 is larger. The reason is that, as the first wheel acceleration Awr1 is different from the second wheel acceleration Awr2, the fluctuation of the first wheel acceleration Awr1 is larger and the degree of the bad road is larger.

Specifically, when the bad road determination section 160 determines that the running road is a bad road based on the information that the first wheel acceleration Awr1 is larger than the first value Arth1 and equal to or less than the second value Arth2, and the second wheel acceleration Awr2 is smaller than the third value Arth3, the bad road amount setting section 170 sets the bad road amounts BAf, BAr to the first bad road amounts BAf1, BAr1.

Further, when the bad road determination section 160 determines that the running road is a bad road based on the information that the first wheel acceleration Awr1 is larger than the second value Arth2 and the second wheel acceleration Awr2 is smaller than the fourth value Arth4, the bad road amount setting section 170 sets the bad road amounts BAf, BAr to the second bad road amounts BAf2, BAr2.

Since the bad road amounts BAf, BAr when the running road surface is a bad road are larger than when the running road surface is not a bad road, the slip amounts SAf, SAr calculated by the anti-lock brake control section 141, 142 from the equations (1) and (2) become small, and the slip amounts SAf, SAr are unlikely to exceed to the control intervention threshold. As a result, it is difficult to execute the anti-lock brake control when the running road surface is a bad road.

Further, when the running road surface is a bad road, the slip amounts SAf, SAr become smaller when the bad road amounts BAf, BAr are set to the large second bad road amounts BAf2, BAr2. Therefore, the slip amounts SAf, SAr are less likely to exceed the control intervention threshold, and it is more difficult to execute anti-lock brake control. Conversely, when the bad road amounts BAf, BAr are set to the small first bad road amounts BAf1, BAr1, the anti-lock brake control is relatively easily executed even when it is determined that the running road surface is a bad road.

Further, when the running road surface is not a bad road, the bad road amount setting section 170 reduces the front wheel bad road amount BAf by the subtraction amount RAf and reduces the rear wheel bad road amount BAr by the subtraction amount RAr.

Since the bad road amounts BAf, BAr gradually decrease (approach 0) when the running road surface is not a bad road, the slip amounts SAf, SAr calculated by the anti-lock brake control section 141, 142 increase while approaching a value obtained by subtracting the wheel speeds Vwf, Vwr from the vehicle speed Vc. Thereby, the slip amounts SAf, SAr are likely to exceed the control intervention threshold. As a result, the anti-lock brake control when the running road surface is not a bad road is more easily executed than when the running road surface is a bad road.

The bad road amount setting section 170 outputs the front wheel bad road amount BAf to the front wheel anti-lock brake control section 141 and outputs the rear wheel bad road amount BAr to the rear wheel anti-lock brake control section 142.

The storage section 190 stores a program for causing the control unit 100 to function as each section described above, the predetermined value Acth, the values Afth1 to Afth8, Arth1 to Arth4 as threshold values, the additional amounts OAf1, OAf2, OAr1, OAr2, and the subtraction amounts RAf, RAr, and the like.

Figure 5:
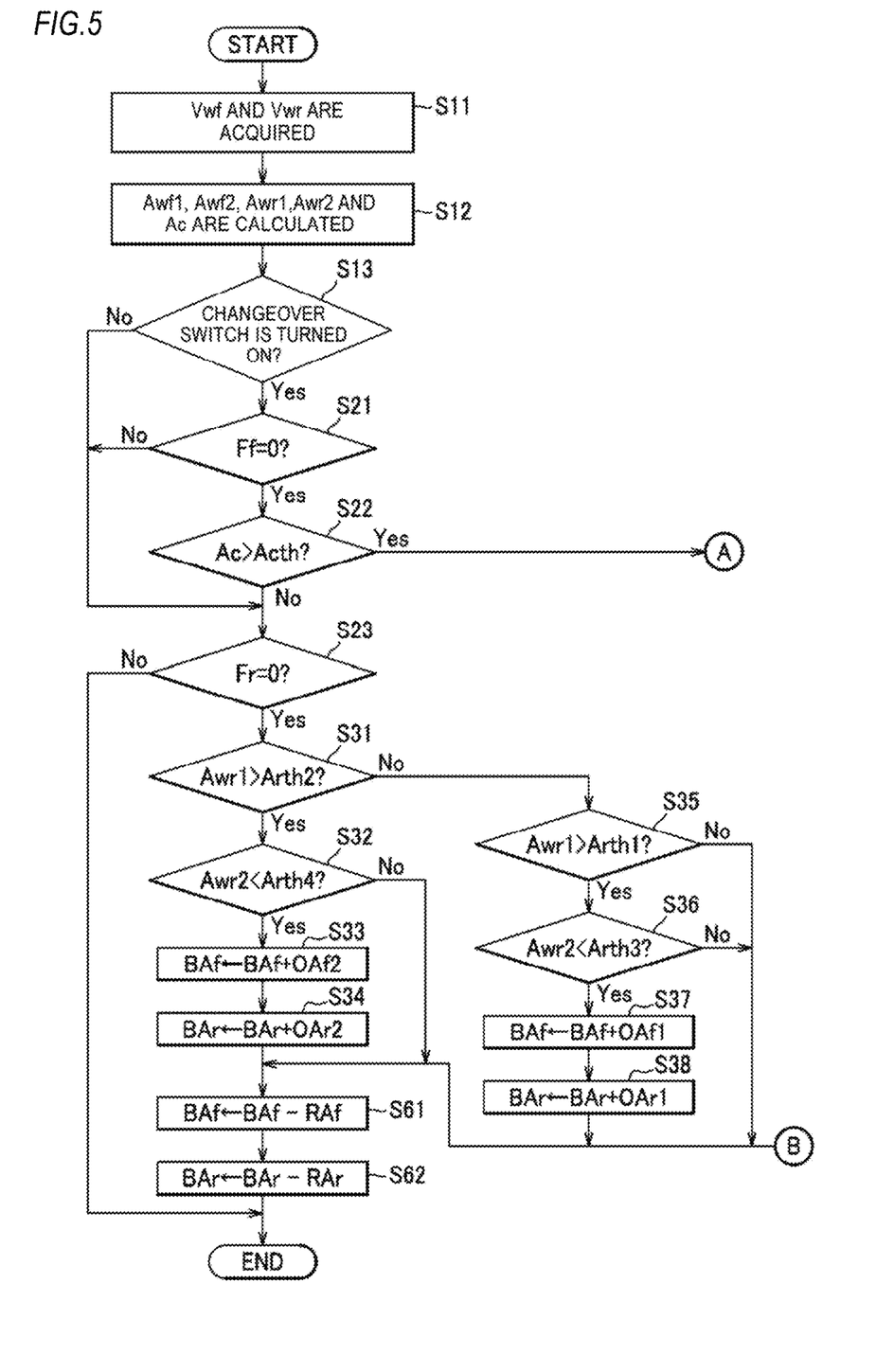
FIG. 5 is a flowchart showing a process performed by the control unit.

Subsequently, the process by the control unit 100, mainly, the process for determining a bad road and the process for setting a bad road amount will be described in detail with reference to FIGS. 5 and 6. The control unit 100 repeatedly executes the process shown in FIGS. 5 and 6 for each predetermined control cycle. As shown in FIG. 5, the control unit 100 first acquires the front wheel speed Vwf and the rear wheel speed Vwr from the wheel speed sensor 51 (S11).

Thereafter, the control unit 100 calculates the front wheel acceleration Awf (the first wheel acceleration Awf1 and the second wheel acceleration Awf2), the rear wheel acceleration Awr (the first wheel acceleration Awr1 and the second wheel acceleration Awr2), and the vehicle acceleration Ac based on the wheel speeds Vwf, Vwr (S12).

Then, the control unit 100 determines whether or not the changeover switch 60 is turned on (S13). When it is determined that the changeover switch 60 is turned on (S13, Yes), the control unit 100 determines whether or not the front wheel ABS execution flag Ff is 0 (S21).

When it is determined that the front wheel ABS execution flag Ff is 0 (S21, Yes), the control unit 100 determines whether or not the vehicle acceleration Ac is larger than the predetermined value Acth (S22). When it is determined that the vehicle acceleration Ac is larger than the predetermined value Acth (S22, Yes), as shown in FIG. 6, the control unit 100 determines whether or not the rear wheel ABS execution flag Fr is 0 (S24).

When it is determined that the rear wheel ABS execution flag Fr is 1 (S24, No), the control unit 100 determines whether or not the first wheel acceleration Awf1 of the front wheel is larger than the second value Afth2 (S41). When it is determined that the first wheel acceleration Awf1 is larger than the second value Afth2 (S41, Yes), the control unit 100 determines whether or not the second wheel acceleration Awf2 is smaller than the fourth value Afth4 (S42).

Then, when it is determined that the second wheel acceleration Awf2 is smaller than the fourth value Afth4 (S42, Yes), the running road surface is a bad road, and the control unit 100 adds the large additional amount OAf2 to the front wheel bad road amount (previous value) BAf (S43) and adds the large additional amount OAr2 to the rear wheel bad road amount (previous value) BAr (S44).

Thereafter, as shown in FIG. 5, the control unit 100 calculates the front wheel bad road amount (present value) BAf (the second bad road amount BAf2) by subtracting the subtraction amount RAf from the front wheel bad road amount BAf (S61), and calculates the rear wheel bad road amount (present value) BAr (the second bad road amount BAr2) by subtracting the subtraction amount RAr from the rear wheel bad road amount BAr (S62). In this way, the control unit 100 ends its process.

Figure 6:
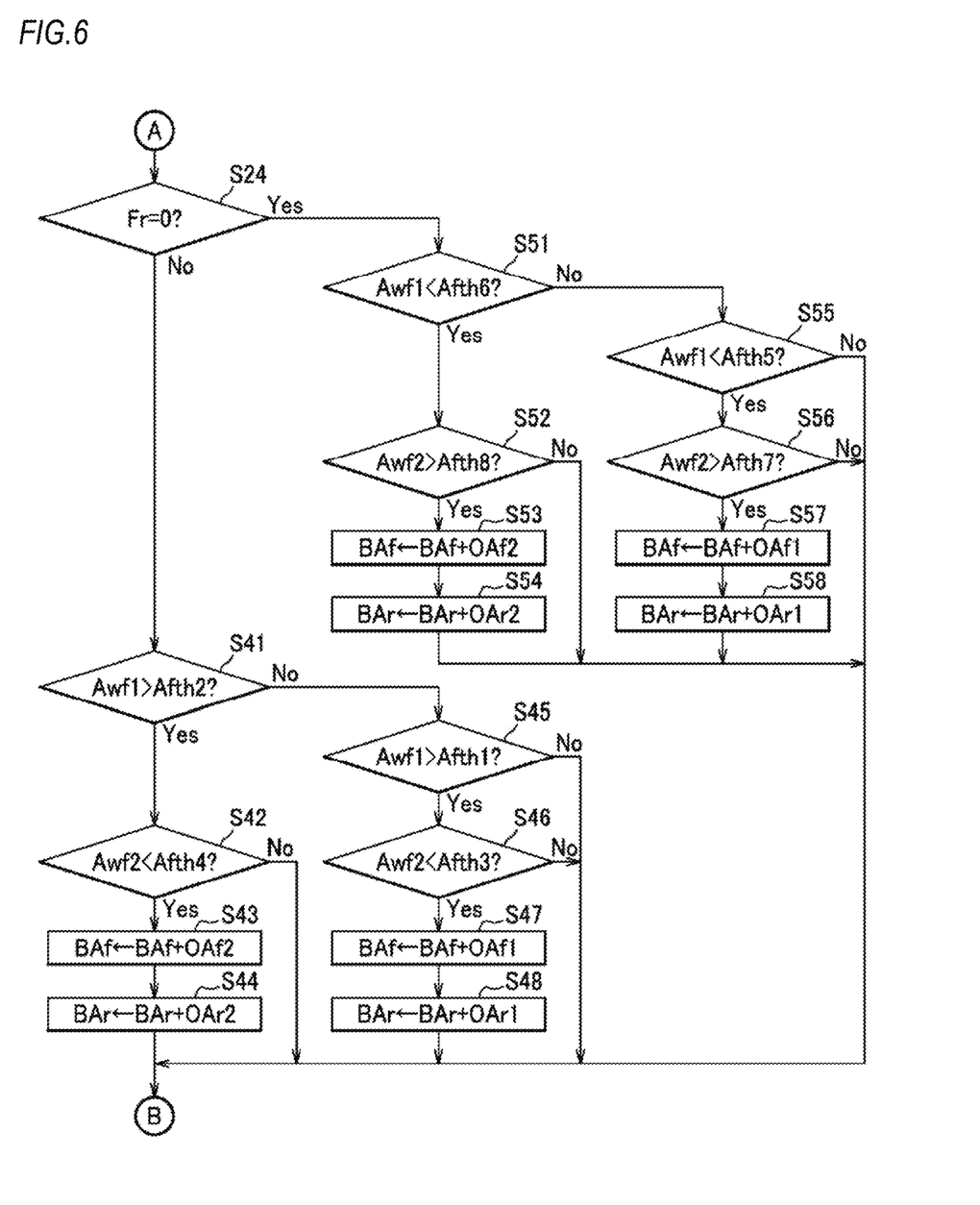
FIG. 6 is a flowchart showing a process performed by the control unit.

On the other hand, when it is determined in Step S41 in FIG. 6 that the first wheel acceleration Awf1 is equal to or less than the second value Afth2 (No), the control unit 100 determines whether or not the first wheel acceleration Awf1 is larger than the first value Afth1 (S45). When it is determined that the first wheel acceleration Awf1 is larger than the first value Afth1 (S45, Yes), the control unit 100 determines whether or not the second wheel acceleration Awf2 is smaller than the third value Afth3 (S46).

Then, when it is determined that the second wheel acceleration Awf2 is smaller than the third value Afth3 (S46, Yes), the running road surface is a bad road, and the control unit 100 adds the small additional amount OAf1 to the front wheel bad road amount (previous value) BAf (S47) and adds the small additional amount OAr1 to the rear wheel bad road amount (previous value) BAr (S48). Thereafter, the control unit 100 executes the process of Steps S61 and S62 in FIG. 5 to calculate the bad road amounts (present value) BAf, BAr (the first bad road amounts BAf1, BAr1) and ends its process.

When it is determined in Step S42 in FIG. 6 that the second wheel acceleration Awf2 is equal to or larger than the fourth value Afth4 (No), when it is determined in Step S45 that the first wheel acceleration Awf1 is equal to or less than the first value Afth1 (No), or when it is determined in Step S46 that the second wheel acceleration Awf2 is equal to or larger than the third value Afth3 (No), the running road surface is not a bad road.

When the running road surface is not a bad road, as shown in FIG. 5, the control unit 100 calculates the front wheel bad road amount (present value) BAf by subtracting the subtraction amount RAf from the front wheel bad road amount (previous value) BAf (S61) and calculates the rear wheel bad road amount (present value) BAr by subtracting the subtraction amount RAr from the rear wheel bad road amount (previous value) BAr (S62). In this way, the control unit 100 ends its process.

When it is determined in Step S24 in FIG. 6 that the rear wheel ABS execution flag Fr is 0 (Yes), the control unit 100 determines whether or not the first wheel acceleration Awf1 of the front wheel is smaller than the sixth value Afth6 (S51). When it is determined that the first wheel acceleration Awf1 is smaller than the sixth value Afth6 (S51, Yes), the control unit 100 determines whether or not the second wheel acceleration Awf2 is larger than the eighth value Afth8 (S52).

Then, when it is determined that the second wheel acceleration Awf2 is larger than the eighth value Afth8 (S52, Yes), the running road surface is a bad road, and the control unit 100 adds the additional amount OAf2 to the front wheel bad road amount (previous value) BAf (S53) and adds the additional amount OAr2 to the rear wheel bad road amount (previous value) BAr (S54). Then, the control unit 100 executes the subsequent process.

On the other hand, when it is determined in Step S51 that the first wheel acceleration Awf1 is equal to or larger than the sixth value Afth6 (No), the control unit 100 determines whether or not the first wheel acceleration Awf1 is smaller than the fifth value Afth5 (S55). When it is determined that the first wheel acceleration Awf1 is smaller than the fifth value Afth5 (S55, Yes), the control unit 100 determines whether or not the second wheel acceleration Awf2 is larger than the seventh value Afth7 (S56).

Then, when it is determined that the second wheel acceleration Awf2 is larger than the seventh value Afth7 (S56, Yes), the running road surface is a bad road, and the control unit 100 adds the additional amount OAf1 to the front wheel bad road amount (previous value) BAf (S57) and adds the additional amount OAr1 to the rear wheel bad road amount (previous value) BAr (S58). Then, the control unit 100 executes the subsequent process.

When it is determined in Step S52 that the second wheel acceleration Awf2 is equal to or less than the eighth value Afth8 (No), when it is determined in Step S55 that the first wheel acceleration Awf1 is equal to or larger than the fifth value Afth5 (No), or when it is determined in Step S56 that the second wheel acceleration Awf2 is equal to or less than the seventh value Afth7, the running road surface is not a bad road. Therefore, the control unit 100 executes Steps S61 and S62 in FIG. 5 and ends its process.

When it is determined in Step S13 that the changeover switch 60 is turned off (No), when it is determined in Step S21 that the front wheel ABS execution flag Ff is 1 (No), or when it is determined in Step S22 that the vehicle acceleration Ac is equal to or less than the predetermined value Acth (No), the control unit 100 determines whether or not the rear wheel ABS execution flag Fr is 0 (S23).

When it is determined that the rear wheel ABS execution flag Fr is 0 (S23, Yes), the control unit 100 determines whether or not the first wheel acceleration Awr1 of the rear wheel is larger than the second value Arth2 (S31). When it is determined that the first wheel acceleration Awr1 is larger than the second value Arth2 (S31, Yes), the control unit 100 determines whether or not the second wheel acceleration Awr2 is smaller than the fourth value Arth4 (S32).

Then, when it is determined that the second wheel acceleration Awr2 is smaller than the fourth value Arth4 (S32, Yes), the running road surface is a bad road, and the control unit 100 adds the additional amount OAf2 to the front wheel bad road amount (previous value) BAf (S33) and adds the additional amount OAr2 to the rear wheel bad road amount (previous value) BAr (S34). Then, the control unit 100 executes the subsequent process.

On the other hand, when it is determined in Step S31 that the first wheel acceleration Awr1 is equal to or less than the second value Arth2 (No), the control unit 100 determines whether or not the first wheel acceleration Awr1 is larger than the first value Arth1 (S35). When it is determined that the first wheel acceleration Awr1 is larger than the first value Arth1 (S35, Yes), the control unit 100 determines whether or not the second wheel acceleration Awr2 is smaller than the third value Arth3 (S36).

Then, when it is determined that the second wheel acceleration Awr2 is smaller than the third value Arth3 (S36, Yes), the running road surface is a bad road, and the control unit 100 adds the additional amount OAf1 to the front wheel bad road amount (previous value) BAf (S37) and adds the additional amount OAr1 to the rear wheel bad road amount (previous value) BAr (S38). Then, the control unit 100 executes the subsequent process.

When it is determined in Step S32 that the second wheel acceleration Awr2 is larger than the fourth value Arth4 (No), when it is determined in Step S35 that the first wheel acceleration Awr1 is equal to or less than the first value Arth1 (No), or when it is determined in Step S36 that the second wheel acceleration Awr2 is equal to or larger than the third value Arth3 (No), the running road surface is not a bad road. Therefore, the control unit 100 executes Steps S61 and S62 and ends its process.

Meanwhile, when it is determined in Step S23 that the rear wheel ABS execution flag Fr is 1 (No), the control unit 100 ends its process without performing the bad road determination and the setting (changing) on the bad road amounts BAf, BAr.

According to the present embodiment described above, when executing the bad road determination by using the front wheel acceleration Awf, the bad road determination is executed based on the first boundary line Lfth1 and the second boundary line Lfth2 based on two types of wheel accelerations Awf1, Awf2 with different responsiveness. Further, when executing the bad road determination by using the rear wheel acceleration Awr, the bad road determination is executed based on the first boundary line Lrth1 based on two types of wheel accelerations Awr1, Awr2 with different responsiveness. Therefore, the accuracy of the bad road determination can be improved.

Specifically, when the bad road determination is executed based on a plurality of values Afth1 to Afth4 and Arth1 to Arth4 based on the first wheel acceleration Awf1 and the second wheel acceleration Awf2 of the front wheel, the accuracy of the bad road determination can be improved, for example, as compared with the case where the values Afth2, Afth3 are not set and it is determined that the running road is a bad road only when the first wheel acceleration Awf1 is larger than the first value Afth1 and the second wheel acceleration Awf2 is smaller than the fourth value Afth4.

Similarly, when the bad road determination is executed based on a plurality of values Afth5 to Afth8 based on the first wheel acceleration Awf1 and the second wheel acceleration Awf2, the accuracy of the bad road determination can be improved, for example, as compared with the case where the values Afth6, Afth7 are not set and it is determined that the running road is a bad road only when the first wheel acceleration Awf1 is smaller than the fifth value Afth5 and the second wheel acceleration Awf2 is larger than the eighth value Afth8.

Further, since the bad road amounts BAf, BAr are changed according to the first wheel accelerations Awf1, Awr1, the accuracy of the correction associated with the bad road determination can be improved.

Specifically, since the bad road amounts BAf, BAr are set to the large second bad road amounts BAf2, BAr2 when the first wheel accelerations Awf1, Awr1 are larger than the second values Afth2, Arth2 that are larger than the first values Afth1, Arth1, the bad road amounts BAf, BAr can be set according to the degree of the bad road. In this way, the accuracy of correction by the bad road amounts BAf, BAr can be improved.

Similarly, since the bad road amounts BAf, BAr are set to the large second bad road amounts BAf2, BAr2 when the first wheel acceleration Awf1 is smaller than the sixth value Afth6 that is smaller than the fifth value Afth5, the bad road amounts BAf, BAr can be set according to the degree of the bad road. In this way, the accuracy of correction can be improved.

Further, with these configurations, the bad road amounts BAf, BAr can be increased to make it difficult to execute the anti-lock brake control when the degree of the bad road is large, and the bad road amounts BAf, BAr can be reduced to make it relatively easy to execute the anti-lock brake control when the degree of the bad road is small. Further, when the running road surface is not a bad road, the bad road amounts BAf, BAr can be further reduced to make it possible to execute the anti-lock brake control. In this way, the accuracy of the anti-lock brake control can be improved.

Further, since the bad road determination is executed by selectively using one of the front wheel acceleration Awf and the rear wheel acceleration Awr, the bad road determination can be executed by properly using the front wheel acceleration Awf and the rear wheel acceleration Awr according to the state of the motorcycle MC. In this way, the accuracy of the bad road determination can be improved.

For example, when the vehicle acceleration Ac is larger than the predetermined value Acth, such as during acceleration in which an acceleration operation is performed, it may be difficult, from the rear wheel acceleration Awr, to distinguish whether an acceleration operation is performed or whether the motorcycle is run on a bad road. Therefore, in this case, the bad road determination is executed using the front wheel acceleration Awf that is stable because the anti-lock brake control is not executed. In this way, the accuracy of the bad road determination can be improved.

Further, the front wheel acceleration Awf may not be stable during a high deceleration at which the vehicle acceleration Ac is equal to or less than the predetermined value Acth. Therefore, in this case, the anti-lock brake control is not executed, and the bad road determination is executed by using the rear wheel acceleration Awr that is more stable than the front wheel acceleration Awf. In this way, the accuracy of the bad road determination can be improved.

Further, the front wheel acceleration Awf is not stable while the anti-lock brake control is executed. Therefore, in this case, the anti-lock brake control is not executed, and the bad road determination is executed by using the rear wheel acceleration Awr that is more stable than the front wheel acceleration Awf. In this way, the accuracy of the bad road determination can be improved.

Although one embodiment of the present disclosure has been described above, the present disclosure is not limited to the above embodiment, and can be implemented with appropriate modifications.

For example, although, in the above embodiment, the motorcycle MC includes the changeover switch 60 for switching the specification of the bad road determination, a configuration without such a changeover switch may be adopted.

Further, although, in the above embodiment, the third bad road amount is the same as the first bad road amount, the third bad road amount may be different from the first bad road amount. Similarly, although, in the above embodiment, the fourth bad road amount is the same as the second bad road amount, the fourth bad road amount may be different from the second bad road amount.

Further, although, in the above embodiment, the first boundary line is a step-like line formed by four line segments, the first boundary line may be a step-like line formed by five or more line segments. Further, the first boundary line may be, for example, a straight line represented by a linear function, instead of a step-like line. Further, the first boundary line may be, for example, a line including a step-like portion and a straight line portion represented by a linear function, that is, a line including a step-like portion. Further, the first boundary line may be a line including a curved portion. The same also applies to the second boundary line.

Further, although, in the above embodiment, the second boundary line Lfth2 is used only when the bad road determination is executed by using the front wheel acceleration Awf, the second boundary line may be used when the bad road determination is executed by using the rear wheel acceleration Awr.

Further, although, in the above embodiment, a hydraulic brake device using a brake fluid is exemplified as the brake device controlled by the control unit 100 (vehicle brake control device), a brake device may be, for example, an electric brake device that generates a braking force by an electric motor without using a brake fluid.

Further, although, in the above embodiment, the motorcycle MC has a configuration in which the rear wheel brake system BR is operated by the brake pedal LR, the motorcycle MC may have a configuration in which the rear wheel brake system is operated by a manually-operated brake lever, for example.

Further, although, in the above embodiment, the motorcycle MC is exemplified as a vehicle to which the disclosure is applied, the vehicle may be, for example, a bar-handle vehicle other than a motorcycle, such as an auto-tricycle and a buggy car, or may be an automobile or the like.

Further, the components described in the embodiments and modifications described above can be implemented in appropriate combinations.

What is claimed is:

1. A vehicle brake control device comprising:
   a wheel speed acquisition section configured to acquire a wheel speed of one of a front wheel and a rear wheel;
   a wheel acceleration calculation section configured to calculate a wheel acceleration of the one wheel based on the wheel speed;
   an anti-lock brake control section configured to execute an anti-lock brake control for the one wheel based on a slip amount based on the wheel speed and a vehicle speed;
   a bad road determination section configured to determine whether or not a running road surface is a bad road based on the wheel acceleration; and
   a bad road amount setting section configured to set a bad road amount for correcting the slip amount based on the determination result of the bad road determination section,
   wherein the wheel acceleration calculation section calculates, as the wheel acceleration, a first wheel acceleration and a second wheel acceleration in which a high-frequency component is attenuated more than the first wheel acceleration,
   wherein the bad road determination section determines that a running road surface is a bad road when the calculated first wheel acceleration is larger than a first boundary line in an area where the first wheel acceleration is larger than the second wheel acceleration, and wherein the bad road amount setting section increases the bad road amount as the calculated first wheel acceleration is larger when it is determined that a running road surface is a bad road.

2. The vehicle brake control device according to claim 1, wherein the first boundary line has a step-like portion formed by:
   a first line segment in which the first wheel acceleration is a constant first value;
   a second line segment in which the first wheel acceleration is a constant second value larger than the first value;
   a third line segment in which the second wheel acceleration is a constant third value and which connects the first line segment and the second line segment; and
   a fourth line segment in which the second wheel acceleration is a constant fourth value larger than the third value and which extends from the second line segment.

3. The vehicle brake control device according to claim 2, wherein the bad road determination section determines that a running road surface is a bad road when the calculated first wheel acceleration is larger than the first value and equal to or less than the second value, and the calculated second wheel acceleration is smaller than the third value, and the bad road amount setting section sets the bad road amount to a first bad road amount, and
   wherein the bad road determination section determines that a running road surface is a bad road when the calculated first wheel acceleration is larger than the second value and the calculated second wheel acceleration is smaller than the fourth value, and the bad road amount setting section sets the bad road amount to a second bad road amount larger than the first bad road amount.

4. The vehicle brake control device according to claim 1, wherein the bad road determination section determines that the running road surface is a bad road when the calculated first wheel acceleration is larger than the first boundary line in the area where the first wheel acceleration is larger than the second wheel acceleration and the first wheel acceleration increases.

5. The vehicle brake control device according to claim 1, further comprising a changeover switch configured to switch a specification of the bad road determination.

6. The vehicle brake control device according to claim 5, wherein the changeover switch is turned off when it is determined that there is no front wheel anti-lock brake execution or when it is determined that a vehicle acceleration is equal to or less than a predetermined value.

7. The vehicle brake control device according to claim 6, when the changeover switch is turned off, the bad road determination section executes the had road determination only using a rear wheel acceleration.

8. The vehicle brake control device according to claim 5, wherein the bad road determination section executes the bad road determination by selectively using one of a front wheel acceleration and a rear wheel acceleration when the changeover switch is turned on.

9. The vehicle brake control device according to claim 1, wherein the wheel acceleration calculation section comprises:
   a front wheel acceleration calculation section configured to calculate the first wheel acceleration by differentiating the front wheel speed and calculating the second wheel acceleration by differentiating a value obtained by filtering the front wheel speed by a low-pass filter, the second wheel acceleration has a value in which a high-frequency component is attenuated more than the first wheel acceleration; and a rear wheel acceleration calculation section which calculates the first wheel acceleration by differentiating the rear wheel speed and calculating the second wheel acceleration by differentiating a value obtained by filtering the rear wheel speed by the low-pass filter, the second wheel acceleration has a value in which a high-frequency component is attenuated more than the first wheel acceleration.

10. The vehicle brake control device according to claim 1, wherein
the anti-lock brake control section outputs an instruction for reducing braking force when the wheel accelerations of the front wheel and the rear wheel become 0 or less and the slip amount becomes larger than a control intervention threshold;
when the wheel accelerations become larger than 0 after pressure is reduced, the anti-lock brake control section outputs an instruction for maintaining braking force; and
when the wheel accelerations become 0 or less and the slip amount becomes a control intervention threshold or less after the braking force is maintained, the anti-lock brake control section outputs an instruction for increasing the braking force.

11. The vehicle brake control device according to claim 1, wherein
the wheel anti-lock brake control section calculates the wheel slip amount (SA) by the following equation:

SA=Vc−Vw−BA

BA is a wheel bad road amount set by the bad road amount setting section, Vc is the vehicle speed and Vw is the wheel speed.

12. The vehicle brake control device according to claim 1, wherein the bad road determination section determines a bad road determination by selectively using one of a front wheel acceleration and a rear wheel acceleration at least based on information on whether or not the anti-lock brake control for the front wheel is executed and the vehicle acceleration.

13. The vehicle brake control device according to claim 12, wherein
the bad road determination section executes the bad road determination by using the front wheel acceleration when the anti-lock brake control for the front wheel is not executed and the vehicle acceleration is larger than a predetermined value; and
when executing the bad road determination by using the front wheel acceleration, the bad road determination section executes the bad road determination based on a first boundary line where the first wheel acceleration increases as the second wheel acceleration increases when the anti-lock brake control for the rear wheel is executed.

14. The vehicle brake control device according to claim 13, wherein
when executing the bad road determination by using the front wheel acceleration, the bad road determination section executes the bad road determination based on a second boundary line where the first wheel acceleration increases as the second wheel acceleration increases when the anti-lock brake control for the rear wheel is not executed.

15. The vehicle brake control device according to claim 14, wherein
the bad road determination section determines that a running road is a bad road when the calculated first wheel acceleration is smaller than the second boundary line in an area where the first wheel acceleration is smaller than the second wheel acceleration.

16. The vehicle brake control device according to claim 1, wherein
the bad road determination section executes the bad road determination by selectively using one of q front wheel acceleration and a rear wheel acceleration when a changeover switch is turned on; and
when the changeover switch is turned off, the bad road determination section does not execute the bad road determination using the front wheel acceleration but executes only the bad road determination using the rear wheel acceleration.

17. A vehicle brake control device comprising:
a wheel speed acquisition section configured to acquire a wheel speed of one of a front wheel and a rear wheel;
a wheel acceleration calculation section configured to calculate a wheel acceleration of the one wheel based on the wheel speed;
an anti-lock brake control section configured to execute an anti-lock brake control for the one wheel based on a slip amount based on the wheel speed and a vehicle speed;
a bad road determination section configured to determine whether or not a running road surface is a bad road based on the wheel acceleration; and
a bad road amount setting section configured to set a bad road amount for correcting the slip amount based on the determination result of the bad road determination section,
wherein the wheel acceleration calculation section calculates, as the wheel acceleration, a first wheel acceleration and a second wheel acceleration in which a high-frequency component is attenuated more than the first wheel acceleration,
wherein the bad road determination section determines that a running road surface is a bad road when the calculated first wheel acceleration is smaller than a second boundary line in an area where the first wheel acceleration is smaller than the second wheel acceleration, and
wherein the bad road amount setting section increases the bad road amount as the calculated first wheel acceleration is smaller when it is determined that a running road surface is a bad road.

18. The vehicle brake control device according to claim 17,
wherein the second boundary line has a step-like portion formed by:
a fifth line segment in which the first wheel acceleration is a constant fifth value;
a sixth line segment in which the first wheel acceleration is a constant sixth value smaller than the fifth value;
a seventh line segment in which the second wheel acceleration is a constant seventh value and which connects the fifth line segment and the sixth line segment; and
an eighth line segment in which the second wheel acceleration is a constant eighth value smaller than the seventh value and which extends from the sixth line segment.

19. The vehicle brake control device according to claim 18,
wherein the bad road determination section determines that a running road surface is a bad road when the calculated first wheel acceleration is smaller than the fifth value and equal to or larger than the sixth value, and the calculated second wheel acceleration is larger than the seventh value, and the bad road amount setting section sets the bad road amount to a third bad road amount, and wherein the bad road determination section determines that a running road surface is a bad road when the calculated first wheel acceleration is smaller than the sixth value and the calculated second wheel acceleration is larger than the eighth value, and the bad road amount setting section sets the bad road amount to a fourth bad road amount larger than the third bad road amount.

* * * * *